(No Model.)

F. MANKEY.
PROCESS OF MANUFACTURING ORNAMENTAL MOLDINGS.

No. 347,361. Patented Aug. 17, 1886.

WITNESSES:
Gustave Dieterich
Edgar Goodwin

INVENTOR
Frederick Mankey.
BY Park Benjamin
ATTORNEY

UNITED STATES PATENT OFFICE.

FREDERICK MANKEY, OF WILLIAMSPORT, PENNSYLVANIA.

PROCESS OF MANUFACTURING ORNAMENTAL MOLDINGS.

SPECIFICATION forming part of Letters Patent No. 347,361, dated August 17, 1886.

Application filed May 11, 1886. Serial No. 201,824. (No specimens.)

*To all whom it may concern:*

Be it known that I, FREDERICK MANKEY, of Williamsport, Lycoming county, Pennsylvania, have invented a new and useful Improvement in the Process of Manufacture of Ornamental Moldings, of which the following is a specification.

Figure 4:
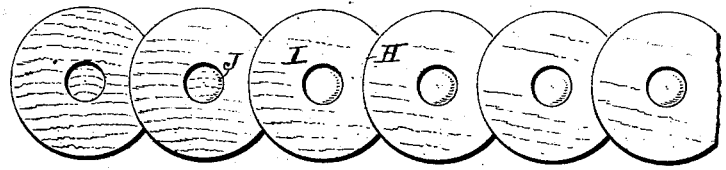

My invention relates to a new process for the manufacture of ornamental trims or moldings, of the form and design substantially as shown in Fig. 4 of the accompanying drawings—that is to say, having the appearance of a series of overlapping disks. Hitherto moldings of this pattern have either been built up from separate disks glued together or carved by hand, the work in either case involving much time and expense. By my process I am enabled to make this molding both rapidly and cheaply, and at the same time to produce better and more accurate work.

Figure 1:
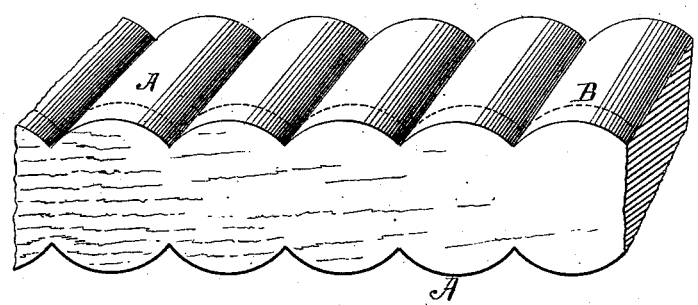
Figure 2:
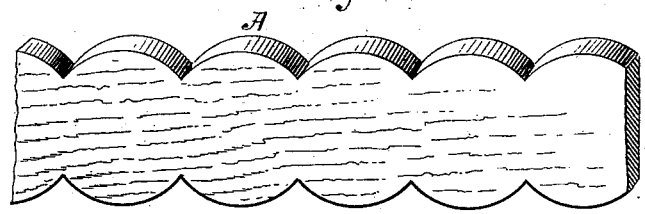
Figure 3:
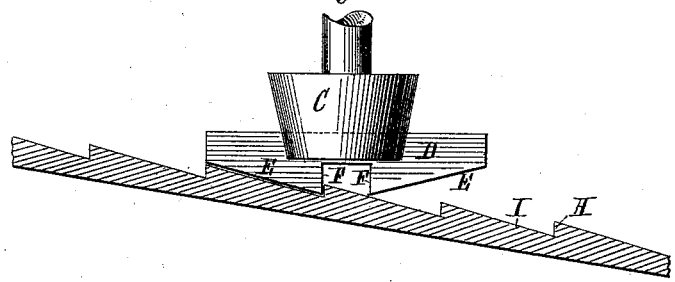

In the accompanying drawings, Figure 1 is a perspective view of the block or plank from which the molding is to be cut, the said block having its faces formed as shown. Fig. 2 is a slice or strip cut from said block. Fig. 3 shows the disposition of the aforesaid slice or strip when subjected to the action of the cutting-tool. Fig. 4 represents the finished molding.

Similar letters of reference indicate like parts.

The block or plank from which the molding is to be made is first subjected to the action of cutting-tools, preferably rotary cutters, whereby on both faces of said block, and in a direction transversely the grain thereof, the convex elevations A are produced. The block is then cut longitudinally in the direction of the dotted line B, Fig. 1, into strips, one of which strips is represented separately in Fig. 2. Upon the face of this strip or bar the desired configuration is produced by means of the rotary cutting-head C, which carries the knife D, of which knife E is the cutting-edge. The strip is placed in an inclined position, as shown in Fig. 3, and is thus subjected to the action of the knife. The middle portion (at F) of the knife is removed, so that a vertical cutting-edge is formed, which cuts the curved boundary H, for example, Fig. 4, while the inclined cutting-edge E forms the correspondingly-beveled surface I.

It will be observed that by reason of the inclination of the bar or strip half of the edge of the knife passes over the surface of the strip while the other half is operating. As soon as one inclined surface, I, is thus cut, the strip is advanced for a suitable distance, and a second beveled surface is produced in like manner. The circular figures J are subsequently formed at the centers of the apparent disks by any suitable cutting-tool.

I claim—

1. The process of producing a series of successive inclined surfaces upon the face of a bar, which consists in placing said bar in an inclined position and subjecting the same to the action of a cutting-tool held in a fixed position with relation to the longitudinal movement of the bar, and operating transversely the face of said bar to form one of said surfaces, then moving said bar forward in a longitudinal direction, and again subjecting it to the action of the cutter, and so on, substantially as described.

2. The process of producing an ornamental molding, substantially as herein shown and described, which consists, first, in forming upon opposite sides of a block or plank a series of elongated convex elevations transverse the grain; second, dividing said block longitudinally into strips or bars, and, third, subjecting said bars while in an inclined position to the action of a cutter, whereby a series of successive inclined or beveled surfaces are formed on the face of said bar, substantially as set forth.

3. The process of producing the ornamental molding, substantially as represented in Fig. 4, which consists in first forming on opposite sides of a block or plank a series of elongated rounded elevations, A, transverse the grain; second, dividing said block longitudinally into strips or bars; third, subjecting each strip while in an inclined position to the action of the cutting-tool E, whereby a series of inclined surfaces, I, having curved boundaries H, are formed on the face of said strip, substantially as described.

FREDERICK MANKEY.

Witnesses:
F. WEST PAGE,
F. N. PAGE.